United States Patent Office 2,981,401
Patented Apr. 25, 1961

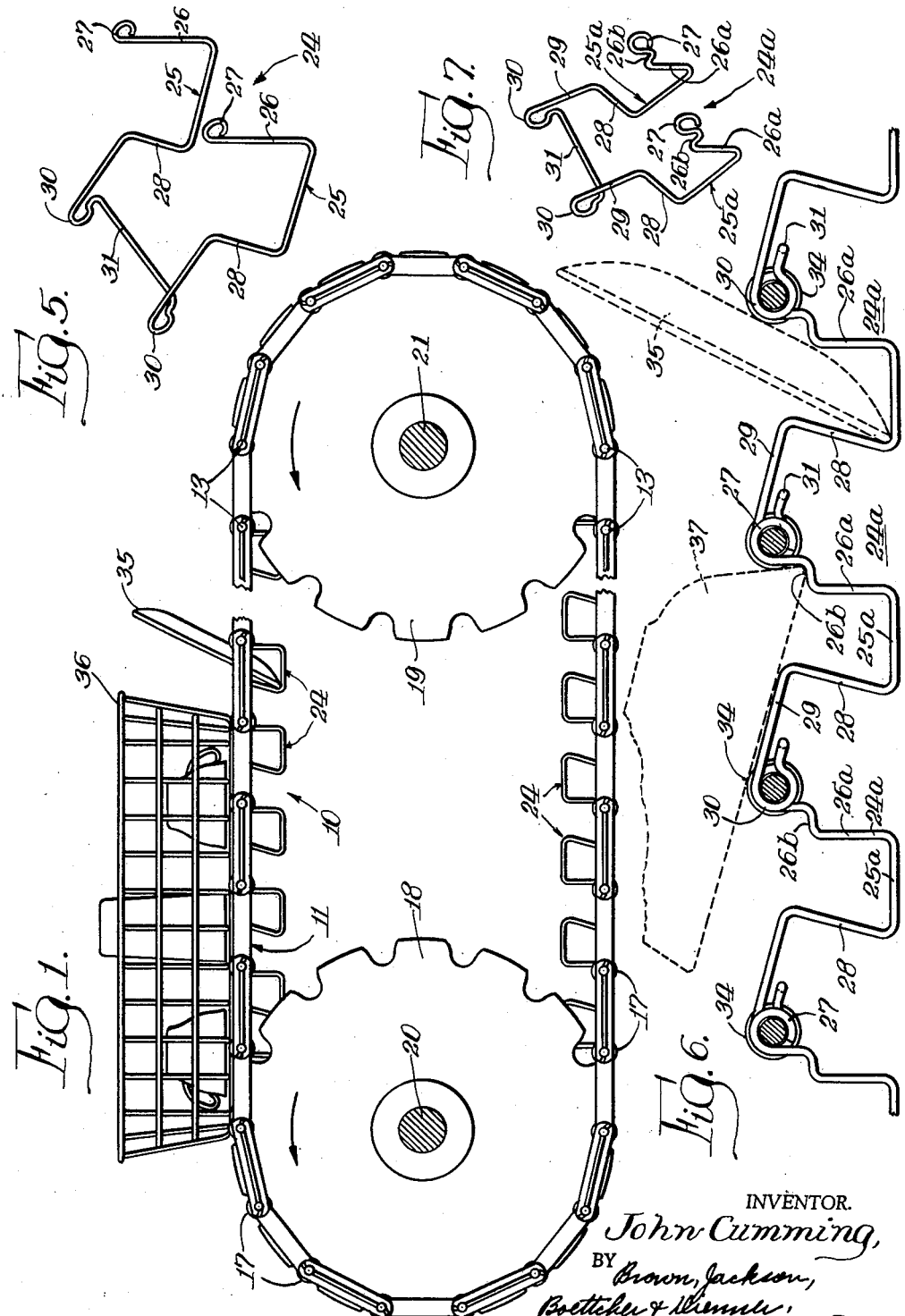

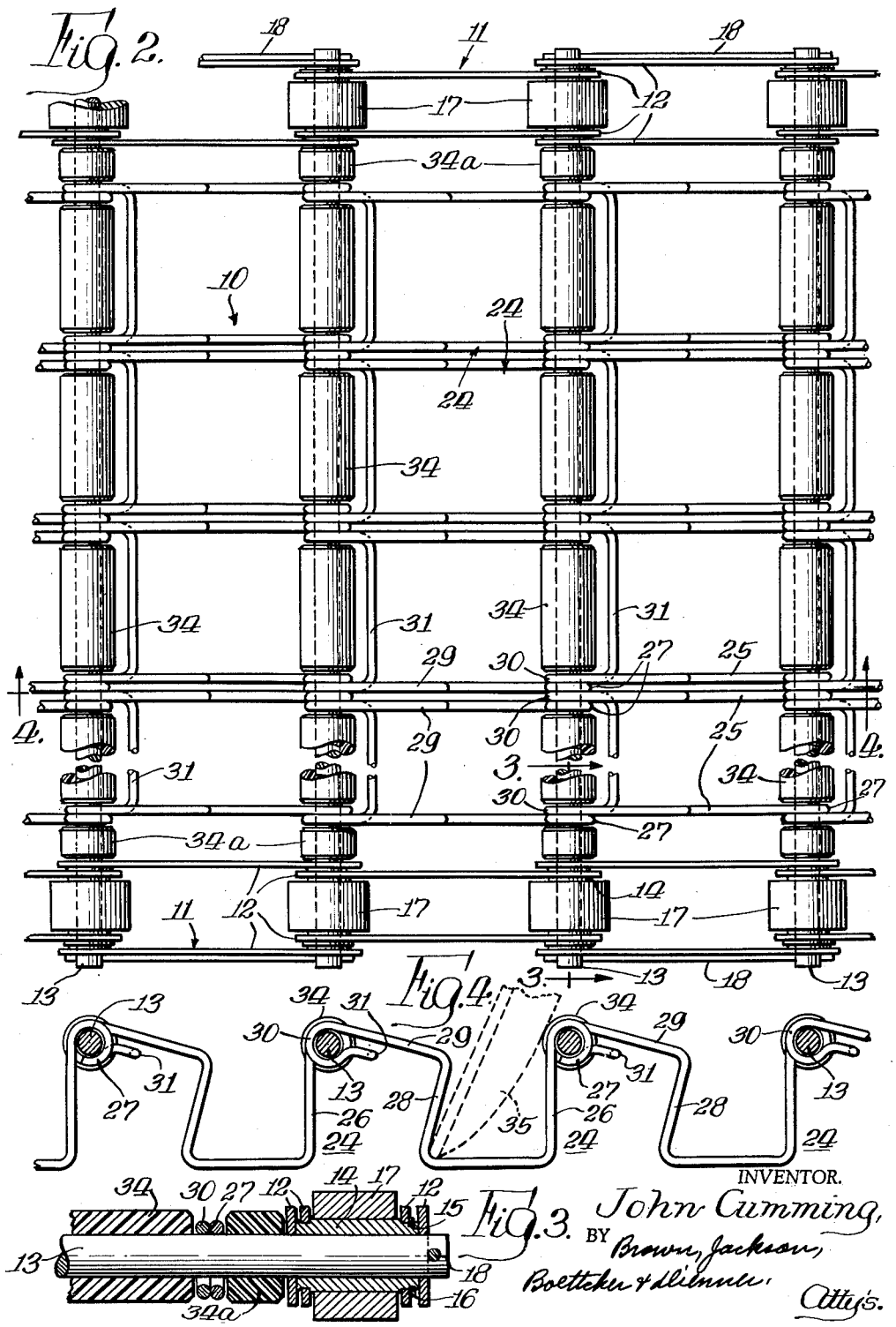

2,981,401
CONVEYOR FOR DISHWASHING MACHINES

John Cumming, River Forest, Ill., assignor to G. S. Blakeslee & Co., Cicero, Ill., a corporation of Illinois Filed Jan. 19, 1959, Ser. No. 787,599
1 Claim. (Cl. 198—131)

This invention relates to conveyors and has to do more particularly with endless conveyors intended for use in dishwashing machines and for analogous purposes.

In known types of dishwashing machines dishes and other articles to be washed are placed upon an endless conveyor and moved thereby through the machine while subjected to washing, rinsing and drying operations. It is desirable that flatware, such as plates, saucers, platters and the like, be supported edgewise in such position that the washing and rinsing solutions or liquids may be projected against them to best advantage, while hollow ware, such as bowls, cups and the like, preferably are placed in inverted position on the upper run of the conveyor so as to be acted upon to best advantage by the washing and rinsing sprays. The articles under treatment should be effectively held in position so as not to be displaced, with resultant breakage, and it is desirable that the conveyor be such that baskets or trays containing table-ware, such as tumblers, cups, knives and forks and spoons and other small articles may be readily be placed upon and effectively supported by the top run of the conveyor. In its travel through the machine the conveyor is subjected to wide variations in temperature with resultant expansion and contraction of the conveyor, and it is important that means be provided to accommodate such expansions and contractions. In many of the known dishwashing machines the above requirements are not fully met with the result that objectionable breakage occurs and the upper run of the conveyor will not readily accommodate trays or baskets of smaller articles to be washed.

My invention is directed to a conveyor which fully meets all of the above requirements, is comparatively inexpensive, effectively retains in position the articles being washed, provides a substantially smooth and unobstructed support at the upper run of the conveyor for baskets or trays or similar containers and accommodates expansion and contraction without risk of injury or breakage to parts of the conveyor. More specifically, I provide a conveyor having links providing recesses or pockets extending inwardly between the runs of the conveyor for reception of dishes and similar articles, the links effectively holding the articles in position and being resilient to accommodate expansion and contraction of the conveyor, the top surface of the upper run of the conveyor being free of obstructions and flat for reception of baskets or trays positioned thereon. In one form of my invention the body links of the conveyor, providing the pockets, are so formed as to facilitate positioning and supporting upon the upper run of the conveyor hollow ware, such as bowls, in inverted position. Further objects and advantages of my invention will appear from the detail description.

In the drawings:

Figure 1 is a side view, partly broken away, of a conveyor embodying my invention, and the associated sprocket wheels;

Figure 2 is a fragmentary top plan view, on an enlarged scale, of the conveyor of Figure 1;

Figure 3 is a sectional view, on an enlarged scale, taken substantially on line 3—3 of Figure 2, certain parts being shown in elevation;

Figure 4 is a sectional view, taken substantially on line 4—4 of Figure 2, of the upper run of the conveyor;

Figure 5 is an isometric view, on an enlarged scale, of one of the body links of the conveyor;

Figure 6 is a view similar to Figure 4, but showing a modified form of conveyor embodying my invention; and Figure 7 is an isometric view, on an enlarged scale, of one of the body links of the conveyor of Figure 6.

The conveyor comprises an inner or body portion 10 disposed between side drive chains 11. The drive chains 11 are formed of inner and outer pairs of links 12 disposed with their ends in overlapping relation. Uniformly spaced cross rods 13 project beyond body portion 10 through the outer pairs of links 12 and receive upon their end portions bushings 14 extending through the overlapping end portions of inner pairs of links 12. As is shown more clearly in Figure 3, the bushing 14 extends inwardly a short distance beyond the innermost link 12 and has its inner end expanded so as to be fixed in that link. The bushing 14 is reduced at its outer end portion, which passes through the outer one of the inner pair of links 12, and is provided, adjacent its outer end, with a shallow circumferential groove 15 which receives a snap ring 16 engaging therein at the outer face of the last mentioned link. The cross rods 13, the bushings 14 and the links 12 preferably are formed of steel, though they may be formed of any suitable material. Each of the bushings 14 receives a roller 17 mounted thereon between the ends of the inner pair of links. The cross rods 13 are provided, at the outer faces of the outermost links, with diametrical bores which receive lock wires 18 inserted therethrough with their end portions projecting beyond the rods 13, bent so as to guard against dislodgement of such lock wires. The snap rings 16 space the overlapping ends of the links, at the outer ends of rollers 17, apart from each other, the bushings 14 space the outermost and the innermost links 12 apart and also space the inner pair of links apart, the inner one thereof being fixed to the bushing as above described. The bushing 14, being fixed to the inner one of the inner pair of links provides a wide bearing surface on the cross rod 13, which is desirable as guarding against concentrated loads and excessive wear. The conveyor passes about sprocket wheels 18 and 19 secured on shafts 20 and 21, respectively, rotatably mounted in a suitable known manner. It may be assumed, for purposes of description, that the shaft 21 of the sprocket wheel 19 is driven by known means and at proper speed in counterclockwise direction, as viewed in Figure 1, advancing the upper run of the conveyor toward the left. As will be understood, the sprocket wheels are provided with projections or teeth suitably spaced for engaging the rollers 17 for driving and guiding the conveyor. Within the broader aspects of my invention, the side chains may be of any suitable construction and the conveyor may be driven in any suitable manner. In practice, the washing machine is provided with horizontal tracks upon which the rollers 17 at the upper run of the conveyor travel for supporting that run in substantially horizontal position, as is known.

Body links 24 are mounted between adjacent cross rods 13 for supporting dishes and similar articles in position to be operated upon. The links 24 may be formed of any suitable material. Preferably they are formed of resilient stainless steel wire of suitable gauge bent to appropriate shape. Each of the links 24 comprises two side frames 25 of substantially U shape, the following arms 26 of which are provided at their upper ends with eyes 27 which receive snugly, but not tightly, the adjacent cross rod 13. The leading arms 28 are provided with fingers 29 extending therefrom toward the other one of the two adjacent cross rods 13 between which the links 24 are disposed. The arms 29 are provided at their leading ends with eyes 30 which receive snugly, but not tightly, such other cross rod 13, the eyes 30 being connected by an integral cross bar 31 connecting the side frames 25 and spacing them apart lengthwise of the cross rods 13. As is shown more clearly in Figure 2, the eyes 27 and 30 of the links 24 preferably are disposed in alternating or staggered relation on the cross rods 13, which is preferred but not essential. It will be seen that each of the cross rods 13 has thereon a plurality of groups of eyes at the upper ends of the arms of the links 24, such groups being spaced apart lengthwise of the cross rods 13 and each comprising four eyes, except the two outermost groups each of which comprises but two eyes.

Protecting sleeves 34 are mounted upon the cross rods 13 between the groups of eyes 27 and 30. The sleeves 34 are formed of comparatively soft material, nylon, and are of somewhat greater diameter than the adjacent eyes 27 and 30 and spacer collars 34a, formed of the same material, and of the same diameter, as sleeves 34, are mounted on cross rods 13, between the side drive chains and the outermost pair of eyes 27, 30 of the body links 24. As is shown more clearly in Figure 4, the leading arm 28 of each frame 25 of the respective links 24 is inclined outwardly toward the following arm 26. The links 24 provide, at the upper run of the conveyor, upwardly opening recesses or pockets extending downwardly between the upper and the lower runs and adapted for reception of plates or similar articles inserted edgewise therein. Referring to Figure 4, a plate or similar article 35 is indicated in broken lines as inserted into one of the links 24. It will be seen that the plate 35 is disposed in a position inclined slightly rearward, that is, toward the following arm 26 of the link, with its edge in contact with arm 28 and rests upon the sleeve 34 so as to be held out of contact with the metal parts of the conveyor. The inclination of arm 28 of link 24 upward toward arm 26 thereof assures that the plate or article 35 will be effectively held in position and sleeve 34 guards against contact of the plate with the metal parts of the conveyor, except at the points of contact thereof at its lower edge with link 24, thereby reducing likelihood of breakage. By having the links 24 extend inward between the upper and the lower runs of the conveyor, so as to extend downward from the upper run, the upper face of the latter run is unobstructed and presents a substantially flat intermittent supporting surface well suited for reception of a tray or basket 36 seated thereon for containing cups, tumblers, cutlery and other small articles to be washed. Larger articles of hollow ware to be washed, such as large bowls and like articles, may be placed upon the upper face of the upper run of the conveyor in inverted position, such articles being supported by two or more of the cross rods 13 and associated parts, as will be understood.

The modified form of the conveyor of my invention shown in Figures 6 and 7 is the same as that shown in Figures 1 to 5, inclusive, except as to the form of the body links. Accordingly, the same reference numbers are used in Figures 6 and 7, except as to the body links the reference numbers of which are provided with exponents. Referring to Figures 6 and 7, each of the links 24a comprises two side frames 25a each of approximately U shape the following arms 26a of which are bent outwardly a short distance from their upper ends to provide projections or shoulders 26b extending generally lengthwise of the conveyor. The links 24a are provided with eyes 27 at the upper or outer ends of arms 26a, fingers 29 extending from the outer ends of arms 28, eyes 30 at the leading ends of the fingers 29 and a cross bar or spacer 31 connecting the eyes 30; as and for the purposes previously described in connection with the body links 24 of the form of my invention shown in Figures 1 to 5, inclusive. The projections or shoulders 26b of the links 24a provide rests or supports for the edge portion of a bowl or like article of hollow ware placed in inverted position upon the upper run of the conveyor and resting partly upon the shoulders 26b and partly upon the upper run, as will be clear from Figure 6 in which a bowl 37 so disposed is indicated in broken lines.

During travel of the conveyor the links thereof pass about the sprocket wheels 18 and 19 and are positioned by the cross rods 13 substantially radially of the sprocket wheels, as will be understood. The body links are resilient, preferably being formed of steel wire, as previously noted, and readily accommodate any variation in distance between the cross rods 13 in the passage of the conveyor about the sprocket wheel thereby avoiding objectionable stresses which might otherwise occur. Further, contraction and expansion of the conveyor lengthwise, due to its being subjected to wide temperature variations, occurs in its travel lengthwise of the dishwashing machine and the resilient links readily accommodate such expansion and contraction thereby avoiding what might otherwise be objectionable and damaging stresses.

It will be understood that changes in detail may be resorted to without departing from the field and scope of my invention, and I intend to include all such variations, as fall within the scope of the appended claim, in this application in which the preferred forms only of my invention have been disclosed.

I claim:

In an endless conveyor for dish washing machines in which the articles to be washed are subjected to liquid sprays projected upward thereagainst from beneath the upper run of the conveyor, said conveyor having an upper run and a lower run and comprising side driving chains extending lengthwise of said conveyor, parallel rods connecting said chains and extending transversely of said conveyor and spaced apart lengthwise thereof, and a plurality of links of substantially U-shape lengthwise of said conveyor disposed between each two adjacent rods and spaced apart transversely of said conveyor, said links extending inwardly between said runs with their leading arms pivoted on one of said two adjacent rods and their following arms pivoted on the other of said two adjacent rods, said links being open and unobstructed at their sides for downward insertion thereinto of dishes at the upper run of said conveyor, said rods being substantially in a common plane at the upper run of said conveyor.

References Cited in the file of this patent

UNITED STATES PATENTS

| 1,426,179 | Glass | Aug. 15, 1922 |
| 1,737,819 | Wetmore | Dec. 3, 1929 |
| 2,044,744 | Hansen | June 16, 1936 |
| 2,644,473 | Fox et al. | July 7, 1953 |

FOREIGN PATENTS

| 384,221 | Great Britain | Dec. 1, 1932 |